United States Patent Office
3,229,403
Patented Jan. 18, 1966

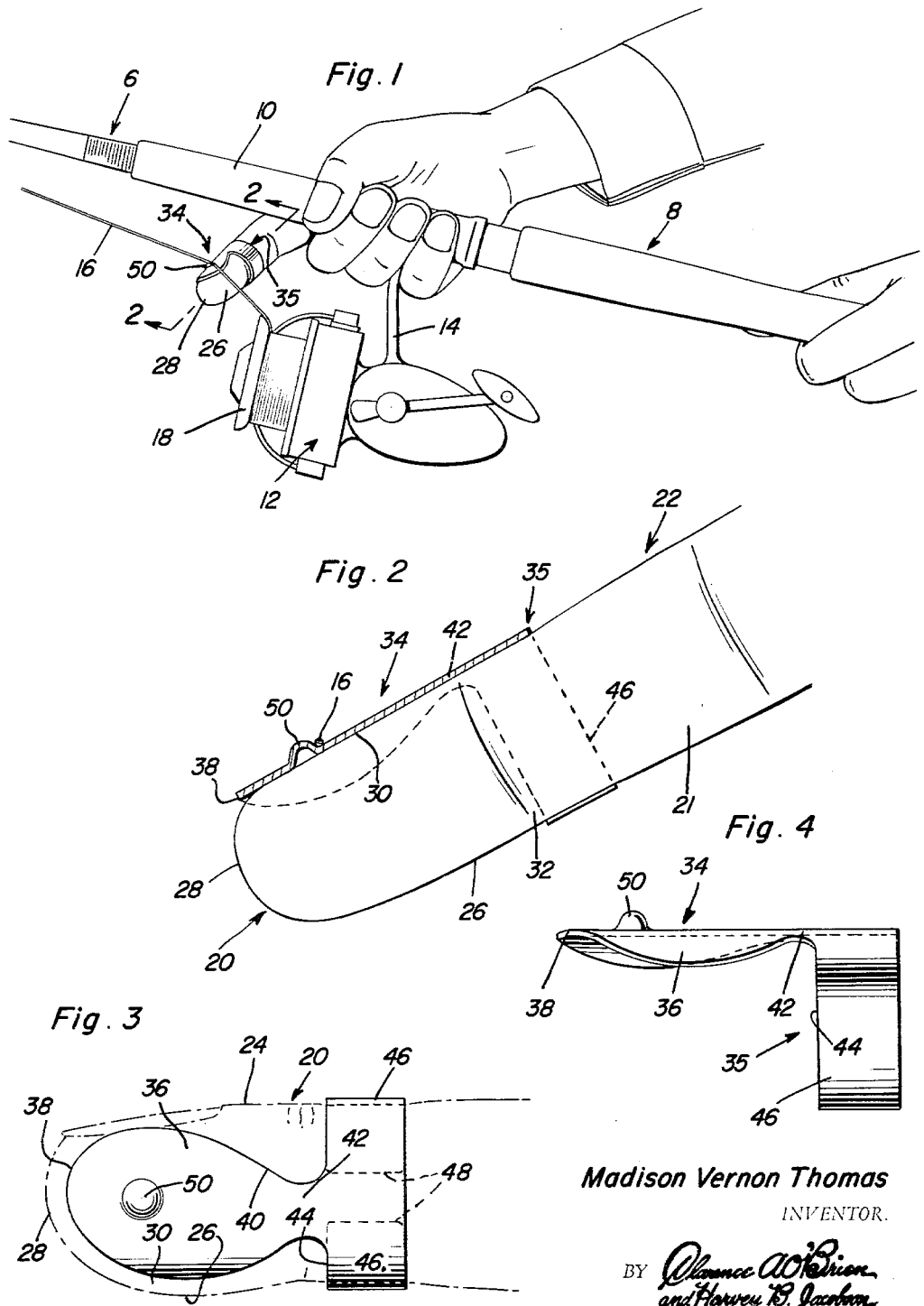

3,229,403
FISHING LINE GUIDING FINGER PROTECTING SHIELD
Madison Vernon Thomas, 1102 Corbett Ave., Wilson, N.C.
Filed Apr. 30, 1964, Ser. No. 363,838
1 Claim. (Cl. 43—4)

The present invention relates to a finger protecting shield or guard which is readily attachable to and detachable from the tip of a fisherman's fingers, for example, the index finger, and which when in use facilitates safe handling and checking of the line as it is payed out from a spinning reel.

The cast lure provides the impetus and force which unwinds the line from the spool on a spinning reel. The line leaving the spool spins off in a whirling motion making about two whorls in the same direction every foot or so. As long as the lure sails out the line continues to spin or peel off the spool. When the lure comes to rest unspooling of the line stops. The fisherman attempts during the cast to assist in guiding, controlling and handling the line, usually with his index finger. Many anglers use and rely on the forefinger while paying out and retrieving the line. Accordingly, the line riding over the skin of the finger may abrade and injure the finger.

The object of the present invention is to provide an improved finger guard or shield which when properly applied and used affords the user the desired line supporting and controlling needs and also minimizes the likelihood of the finger becoming irritated or cut as the case may be.

Briefly the invention comprises a simple saddle-like shield of a size and shape that it covers a minimal but adequate side surface portion of the finger, said shield being equipped with a simple line-guiding boss or detent.

In carrying out the objectives of the herein disclosed invention the saddle-like shield functions to conformingly and cooperatively reside upon a side surface of the tip portion of the finger. The inner end of said shield is provided with a ligature-like adapter or split band which is applicable and attachable to the finger inwardly of the outer phalangeal joint so as not to restrain or inhibit the use of either the tip portion of the finger or the overall finger.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a fishing rod supporting a spinning reel and showing the line being payed out and further showing one hand of the fisherman gripping the handle portion of the rod and the forefinger provided with the improved line-guiding finger-protecting shield;

FIGURE 2 is a view on an enlarged scale showing the index or forefinger and more particularly the attachment and how it is constructed and applied;

FIGURE 3 is a view on a larger scale showing the shield attachment in elevation; and FIGURE 4 is a view of the attachment by itself.

The fishing rod (FIG. 1) is denoted generally by the numeral 6, the handle portion at 8 and forward grip at 10. The spinning reel 12 is bracketed at 14 to the grip 10. The fishing line 16 is being payed out from the flanged spool 18.

The present invention has to do with a simple practical economical attachment, that is, a finger guard attachment which can be readily attached to and removed from the outer end or tip portion 20 of the index finger 22. Inasmuch as the position of the attachment must be oriented in relation to the user's finger for best results, it will be noted (FIG. 3) that the dorsal or top side of the finger, is denoted at 24, the palmar side at 26, the tip at 28, the foward and rearwardly disposed sides at 29 and 30. The joint between the phalanges 20 and 21 is denoted at 32 (FIG. 2).

The attachment is made of appropriate sheet material, is of onepiece construction and embodies two principal component parts, namely, the shield or guard 34 and the accompanying attaching and retaining ligature-like collar 35. The shield 34 is substantially ovate in plan as is evident from FIG. 3, is concavo-convex with the convex surface 36 disposed outwardly and the concave side or surface being suitably contoured to conformingly fit itself on the side surface of the user's finger in the manner illustrated. The broad rounded end 38 preferably terminates short of the tip 28 of the user's finger. The narrowing end portion 40 merges into a reduced neck 42 which is joined integrally with the median portion of the cooperating marginal edge 44 of the adapter collar 35. The curvate end portions 46 of the collar conformingly embrace the phalange 21 with the edge 44 proximal to the joint 32. The end portions 48 are spaced apart thus providing the desired finger-embracing, shield-positioning and retaining result. The shield as better shown in FIG. 3 provides a simple saddle-like line-supporting and controlling guard which functions in the manner illustrated in FIGS. 1 and 2. To accomplish the desired result, the median portion of the convex side is provided with a semispherical outstanding boss 50 which functions as a line guide and assists the user in handling and controlling the fishing line in the manner shown in FIG. 1.

Inasmuch as the shield occupies the position illustrated it will be evident that the user merely turns or twists the index finger axially to assume the position illustrated whereupon the shield serves its intended line-controlling purposes and yet permits the finger to behave in a somewhat normal and easy-to-use manner. Experience has shown that this side location avoids any restraint whatsoever of the dorsal and palmar surfaces of the fingertip. Accordingly, the finger tip is not immobilized or otherwise restricted.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fishing line guiding finger protecting shield adapted to be attached to the user's index finger comprising: a split ring-like band constituting and providing a finger encircling shield-retaining collar adapted to conformingly and removably encircle the middle phalange of the user's index finger and being adapted to maintain a self-retaining position proximal to but inwardly of the phalangeal joint between the first and second phalanges of the finger, and an elongated substantially ovate concavo-convex saddle-lke shield, the concave side of said shield being adapted to reside in conformable contact with one side portion only of the tip portion of said finger, cooperating marginal edges of said shield being curvilineal and free of restrictive engagement with the dorsal surface and palmar surface respectively so as to permit free and unhampered use of (1) the over-all finger and (2) independent flexural movement of the several component portions of said finger particularly the uninhibited tip portion, said shield having an inward offset end portion progressively and gradually decreased in width and constituting a relatively narrow neck, said neck being joined with a limited forward marginal edge portion of said collar substantially diametrically opposite the split portion of said collar and being adapted to bridge the joint between said first and second phalanges, said shield, neck and adjoining collar portion being substantially in longitudinal alignment, the median portion of said shield being dimpled and pressed outwardly and providing a boss, said boss being substantially semispherical and constituting a fishing line guiding and controlling member, said shield being of a length less than the length of the tip portion of the finger with which it is cooperable, the concave side being adapted to cover and shield said one side of said tip portion between the dorsal and palmar surfaces, whereby to enable the user to guidingly control the fishline as it is being payed out or subsequently reeled in and retrieved.

References Cited by the Examiner

UNITED STATES PATENTS

| | | | |
|---|---|---|---|
| 1,160,522 | 11/1915 | Morris. | |
| 1,783,984 | 12/1930 | Shane | 2—21 |
| 2,155,753 | 4/1939 | Cook | 43—4 |
| 2,323,854 | 7/1943 | Silverman | 2—21 |

SAMUEL KOREN, *Primary Examiner.*

ABRAHAM G. STONE, *Examiner.*